United States Patent [19]

Bradley et al.

[11] Patent Number: 5,285,272
[45] Date of Patent: Feb. 8, 1994

[54] VIDEO STORE AND FORWARD ON DEMAND APPARATUS AND METHOD

[75] Inventors: Graham C. Bradley; Everett L. Florence; Gordon R. Reed; Darrin W. Bitter, all of Regina, Canada

[73] Assignee: SaskTel, Canada

[21] Appl. No.: 661,521

[22] Filed: Feb. 26, 1991

[51] Int. Cl.⁵ .................... H04N 7/10; H04N 1/00
[52] U.S. Cl. ..................... 348/6; 379/105; 455/3.2; 455/4.1; 348/473
[58] Field of Search ............ 358/85, 86, 142, 146, 358/147; 379/102, 105, 96; 455/4.1, 5.1, 6.1, 3.1, 3.2, 12.1

[56] References Cited

U.S. PATENT DOCUMENTS

| | | | |
|---|---|---|---|
| 4,381,522 | 4/1983 | Lambert . | |
| 4,388,645 | 6/1983 | Cox et al. | 358/147 |
| 4,450,477 | 5/1984 | Lovett | 358/86 |
| 4,590,516 | 5/1986 | Abraham . | |
| 4,600,921 | 7/1986 | Thomas | 358/147 |
| 4,625,235 | 11/1986 | Watson . | |
| 4,706,121 | 11/1987 | Young | 358/146 |
| 4,709,266 | 11/1987 | Hanas et al. . | |
| 4,734,764 | 3/1988 | Pocock et al. . | |
| 4,761,684 | 8/1988 | Clark et al. . | |
| 4,763,191 | 8/1988 | Gordon et al. . | |
| 4,829,569 | 5/1989 | Seth-Smith et al. | 358/86 |
| 4,890,321 | 12/1989 | Seth-Smith et al. | 358/86 |
| 4,890,322 | 12/1989 | Russell, Jr. | 358/86 |
| 4,891,694 | 1/1990 | Way | 358/86 |
| 4,894,789 | 1/1990 | Yee | 358/86 |
| 4,896,347 | 1/1990 | Auber | 358/146 |
| 4,924,303 | 5/1990 | Brandon et al. | 358/86 |
| 4,937,821 | 6/1990 | Boulton | 358/86 |
| 4,959,862 | 9/1990 | Davidov et al. | 358/86 |
| 5,014,125 | 5/1990 | Pocock et al. | 358/86 |

OTHER PUBLICATIONS

G. Robinson et al, "Touch-Tone" Teletext A Combined Teletext —Viewdata System, IEEE Transactions on Consumer Electronics, vol. CE-25, No. 3, Jul. 1979.

*Primary Examiner*—Wing F. Chan
*Attorney, Agent, or Firm*—Davis, Bujold & Streck

[57] ABSTRACT

A two-stage television signal distribution system, useful for distribution where the first stage of the television distribution occurs over satellite, has a distribution control center for encoding system control information in the vertical blanking interval of a television signal to be broadcast over a first transmission medium to at least one receive station, each receive station being provided with a plurality of video cassette recorders for storing incoming television signals under control of the system control information contained in the television signal. The system further includes a second transmission medium having multiple television channel capacity for transmitting television signals from a receive station to a plurality of terminations (i.e. the audience) where the television signals carried on the second transmission medium include television signals previously stored at the receiving station and may also include the television signal carried on the first transmission medium.

9 Claims, 2 Drawing Sheets

VIDEO STORE AND FORWARD ON DEMAND APPARATUS AND METHOD

FIELD OF THE INVENTION

This invention relates to telecommunications systems for delivery of video programming to a subscriber and more particularly for delivery of video programming on a pay-per-view, television subscription service where subscribers access the video selection using a telephone dial-up request.

SUMMARY OF THE INVENTION

This invention is used in the distribution and delivery of video television signals to an audience over a two stage communications link having a signal storage means between the first and second communications link. The system is provided with a distribution control centre in communication with a plurality of receive stations over a first communications link. The first communications link may be a satellite link or some other suitable link such as a microwave or fibre optic based system. Each receive station of the system is provided with program storage means for storing a plurality of video transmissions or programs. Activation of the storage means of each receive station to record an incoming transmission is controlled by the distribution control centre and is communicated to each receive station preferably over the first communications link carrying the video television signals but may also be by some other means, such as the telephone network. Playback of previously stored transmissions is controlled at the receive station itself. The control may be simply to repeat the previously received movies and video programming or the movies and video programming may be selected by members of the audience served by the receive station by having the members of the station audience communicate with the receive station itself over, for example, the telephone network. Delivery of the signal from the receiver site to the audience over the second communications link is intended to occur on several television channels (i.e. 2-99 for example) and may be accomplished using coaxial or fibre optic cable.

By providing transmission storage means at each receive station, the audience served by each station may tune their television receivers to view not only transmissions currently being made over the first communications link by the distribution control centre but also transmissions which were previously made and recorded at the receive station. Thus, the primary communications link may be used to deliver television programming to the receive station 24 hours per day which is particularly advantageous where the primary communications link is a satellite channel which would otherwise be un-used in the night hours. Moreover, the audience served by the receive station will have a wider selection of programming than the single channel being received at the time the viewing selection is made. The audience may also select movies or other video selections that were previously delivered to the receiving station via satellite (or microwave etc.).

In one of its aspects the invention provides a television signal distribution system including: means for producing a television signal including system control information in the vertical blanking interval thereof; a first transmission means for transmitting said television signal to at least one receive station; at least one storage means at each said receive station for storing television signals received over said first transmission means; storage control means at each said receive station responsive to said system control information to activate said storage means to store a television signal transmitted over said first transmission means; playback control means at each said receive station to activate said storage means to playback a television signal stored therein; second transmission means having multiple television channel capacity for transmitting television signals from each said receive station to a plurality of terminations wherein said television signals carried on said second transmission means include the television signal carried on said first transmission means.

BRIEF DESCRIPTION OF THE DRAWINGS

In the drawings which illustrate embodiments of the invention.

DETAILED DESCRIPTION

Figure 1:
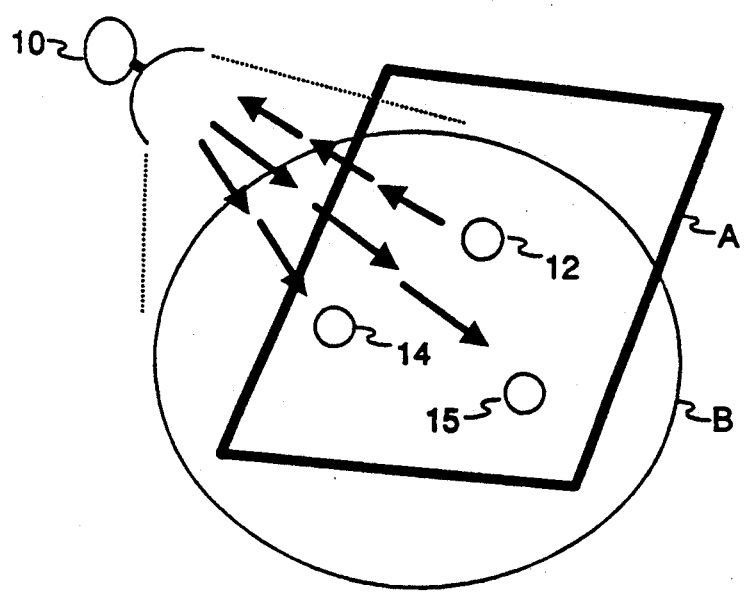
FIG. 1 is a perspective view of the system showing a satellite as the primary signal distribution means.

Referring to FIG. 1, an overview of a satellite based embodiment of the system may be seen. Rectangle "A" represents the video service serving area which comprises a large tract of land, such as a province, state or a group of these, that is to be served by the system described herein. In geostationary orbit above the serving area is a satellite 10 which relays signals received from an uplink 12 back to all points within the footprint of the satellite as shown in the shaded area "B". The serving area in the diagram includes 2 receiving stations 14 and 15. To such a system is added transmission storage means; the activation of the storage means to record a program is under the control of the uplink 12 using the apparatus and in the manner described in more detail below with reference to FIG. 3.

Figure 2:
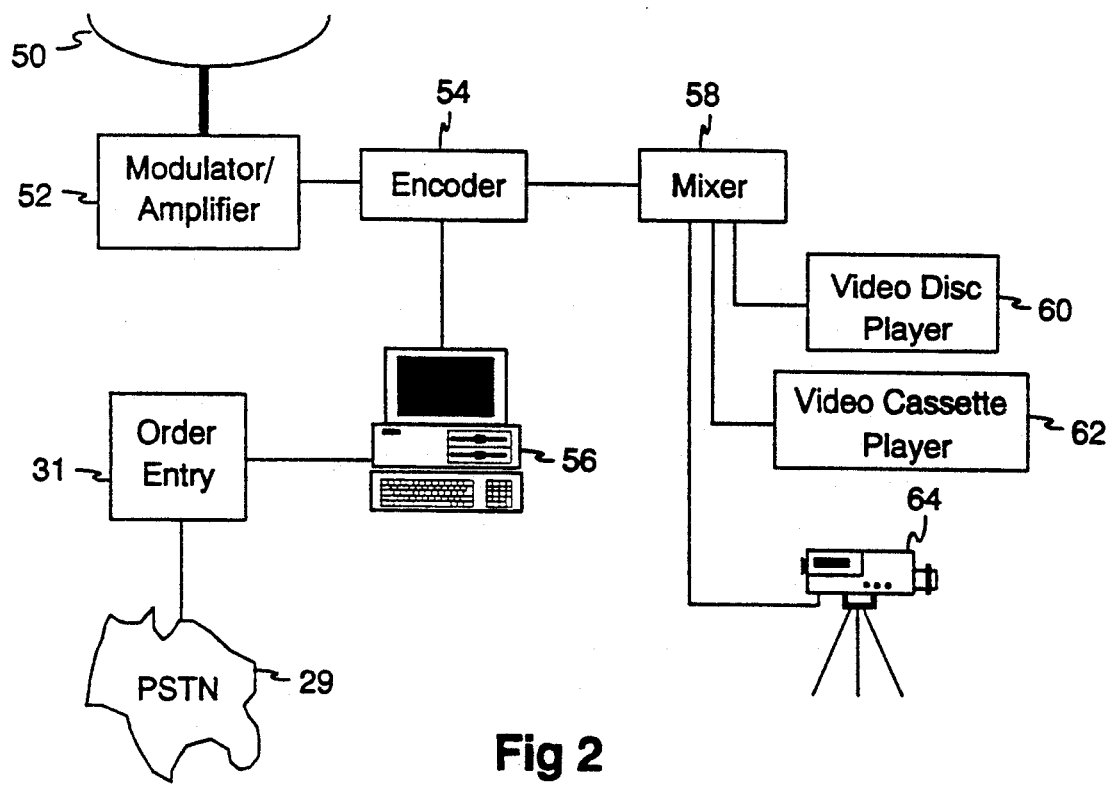
FIG. 2 is a functional block diagram of a production studio for producing a television signal for distribution by the system.

FIG. 2 shows, in more detailed functional block diagram form, the elements comprising the uplink 12 of FIG. 1 for the system. A Video source may be provided by live programming using video camera 64 to capture the programming or the video source may originate from a stored program such as a video cassette recorder (VCR) 62 or video disk player 60. One or more of these signals is selected for transmission by the studio video mixer 58. The video signal is encoded by encoder 54 which combines the video signal with video library directory information and receiving station control information. Both of these information elements are encoded in the vertical blanking interval (VBI) of the NTSC broadcast signal. Several different methods of encoding data in the vertical blanking interval of an NTSC television transmission are known, however, it is preferable to code such data in accordance with a standard to avoid equipment/broadcast incompatibility problems; such as the EIA-516 standard published by the Electronic Industries Association containing the Joint EIA/CVCC Recommended Practice for Teletext: North American Basic Teletext Specification (NABTS).

The receiving station control information is provided to the encoder 54 on a real-time basis by system controller 56. The television signal containing encoded information is then fed to a radio frequency modulator and power amplifier 52 which prepares the signal for transmission to the satellite via parabolic antenna 50. It is preferable for the system controller 56 to be a computer system complete with keyboard to allow operator entry of information to the computer.

The encoder 54 is provided with two encoding algorithms, referred to here for ease of reference as a cyclic encoder and a non-cyclic encoder. Information from both the cyclic encoder and the non-cyclic encoder is inserted into the vertical blanking interval of the signal being broadcast by the uplink. The cyclic encoder contains a buffer of information that is received once by the system controller 56 and then is repetitively inserted into the broadcast signal by the encoder 54. The information contained in the cyclic encoder comprises a video title directory which contains a directory listing of video titles available for distribution over the primary distribution link (i.e. the satellite link). The directory information is organized into pages that are capable of being displayed on a television monitor (i.e. text 40 characters×20 rows). The receiving station decoder 36, also referred to herein as receive station manager, can select and display a given page out of the stream of pages being repetitively (cyclically) broadcast by the encoder 54. The encoder buffer can be replaced as required by the system controller to allow the directory to be updated to reflect new titles available.

As may be appreciated from the foregoing, the cyclic encoder of encoder 54 is used to repetitively transmit a video title directory to the receiving stations 14, 15 using the vertical blanking interval of the broadcast signal. The video title directory maintained by the system controller 56 would contain descriptive information on the video title and may include broadcast schedule information to allow the users at the receiving stations to determine when a desired video title would be broadcast. This directory is maintained in a database on system controller 56 and could be a few pages long or may range up to several thousand pages. The video program database records maintained in the system controller 56 and broadcast by the cyclic encoder of encoder 54 are stored in a file such that they can be added to, modified, or deleted. Each record will have several fields, the most important of which are as follows: A movie title field which contains the title of the movie and should be at least 30 characters long. A movie number field which contains a unique number assigned to each movie in the video library. This number is the one that receiving station operators provide to the order entry process when selecting a movie to be received at the receiving station. A play time field for indicating the movie length in minutes. A movie description field for indicating a description of the movie to allow users to assess the relevance of the movie to their needs.

The purpose of the non-cyclic encoder is to transmit system control information from the system controller 56 to the receiving station decoder 36 which will be acted on by the apparatus of the receiving station to operate the equipment of the receiving station to record a movie or video program that is being broadcast by the uplink. This functionality will be explained in more detail subsequently with reference to FIGS. 3 and 4. The non-cyclic encoder provides system controller 56 with a communications path to the receiving stations to transmit coded real-time control information for the control of the receiving stations. The real-time control information contains receiving station address information to direct the control information to a particular receiving station and apparatus specific control information to allow the uplink to activate a particular program storage apparatus at the receiving station to record the broadcast and to allow the uplink to deactivate program storage apparatus at the receiving station at the end of the broadcast.

Each receiving station operator communicates with the uplink to indicate a program desired to be broadcast by calling the uplink over the public switched telephone network (PSTN) 29 to activate the order entry process of the system controller 56. The order entry process will make a record that captures the receive station identification and the video program desired by the operator of the receiving station making the telephone call. The receiving station operator also indicates which one of the program storage apparatus, i.e. VCR's, located at the receiving station is to be used to record the selected video program. This information is recorded by the system controller 56 for each and every receiving station that calls the uplink. When the requested program is ultimately broadcast, the uplink operator enters this event into the system controller 56 which uses the information captured by the order entry process of system controller 56 to provide information to the non-cyclic encoder of encoder 54 that will be acted on by the apparatus of the receiving stations.

During the order entry process 31, the system controller may also use the captured transaction information to produce billing information for subsequent billing of the user of the system.

When the operator of the uplink broadcasts a particular movie from video disc player 60 or video cassette player 62, or broadcast of a live program captured by video camera 64, the studio mixer 58 is manipulated to select the desired video source and the keyboard of system controller 56 is used by the operator to indicate to the system controller the movie number of the movie or video programming that is about to be broadcast. System controller 56 then scans its database of movie requests and prepares receiving station messages that are passed to encoder 54 which will be received by the receiving stations to activate the previously selected program storage means to start recording the movie being broadcast. At the end of the movie play time (the play time is recorded in the actual movie database), further receiving station messages are passed to encoder 54 which will be received by the receiving stations to de-activate the program storage means as they will now have recorded the movie that was broadcast. A suitable encoder 54 for uplink 12 is manufactured by Norpack Corporation of Kanata, Ontario under model number TDS3 the use of which is described in document 85-08865-01 entitled TDS3 Asynchronous Cyclic Encoder Programmer's Reference Manual and document 85-08986-01 entitled TDS3 Non-Cyclic Encoder Version 2 Technical Reference Manual.

Figure 3:
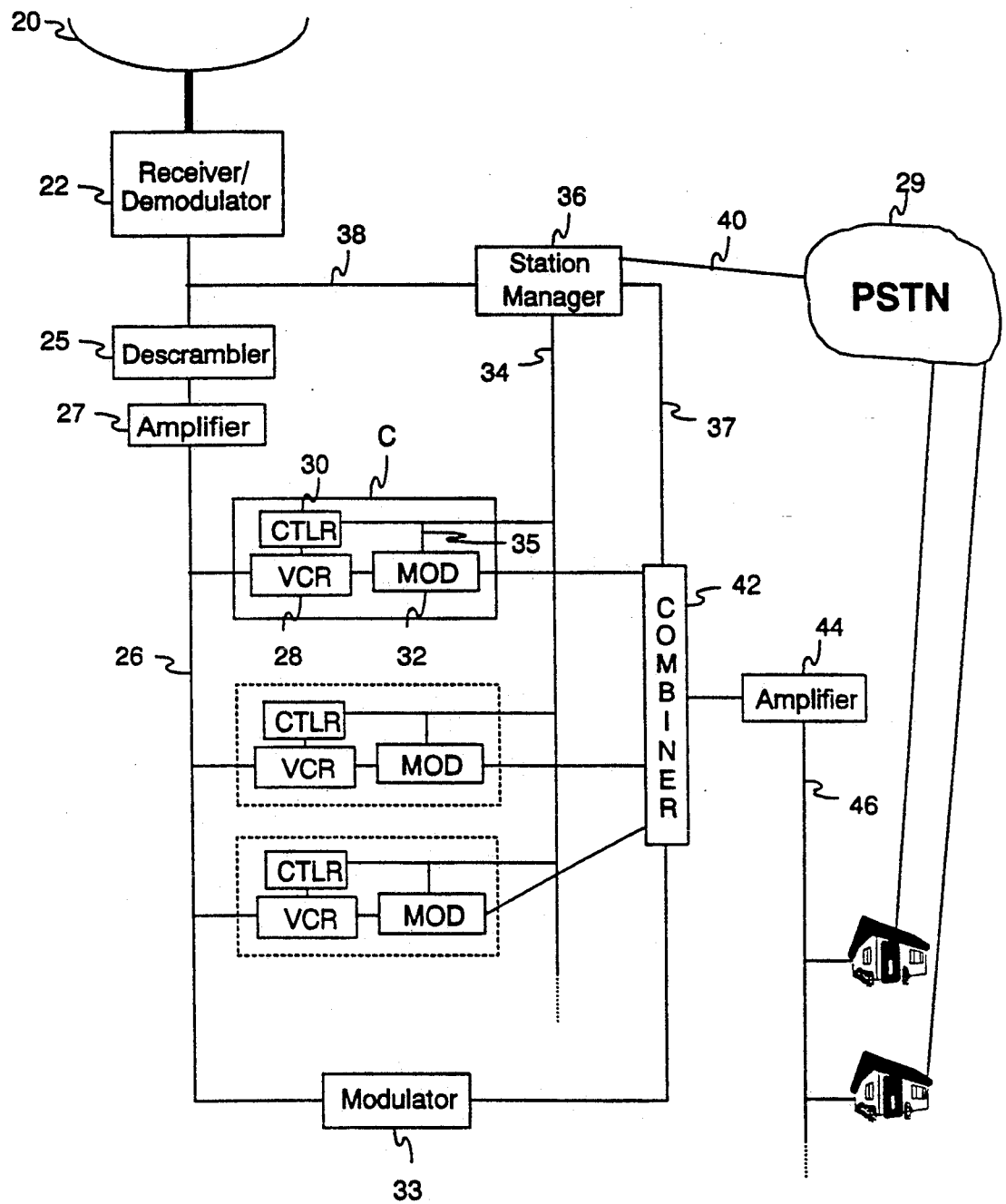
FIG. 3 is a functional block diagram of a receiving station in accordance with the invention.

FIG. 3 shows, in more detail, the functional elements of a receiving station 14 or 15 of FIG. 1 in accordance with the present invention. The receiving station receives the transmission over the primary communications link, namely, satellite broadcasts via a parabolic dish antenna 20. Thereafter the signal is carried to a radio frequency tuner 22 that processes the signal down to a baseband video signal (e.g. a 6 MHz bandwidth NTSC signal). The recovered video signal may in turn be fed to an optional video descrambler 25 which may be provided to recover the incoming signal when it has been scrambled for security reasons. The recovered video signal is then fed to a distribution amplifier 27 where the signal is amplified for distribution to a number of receivers, comprising the elements enclosed in the shaded area "C", along bus 26. The receivers "C" provide the receive station with a plurality of recording/playback devices remotely operable by the uplink 12 in the manner described subsequently. Each receiver "C" has a first element being a video cassette recorder (VCR) 28 which is used to record the inbound signal under the control of the second element, namely: an addressable VCR controller 30. Activation of the VCR (i.e. play, record, pause, rewind, etc.) is under the control of the addressable VCR controller 30. Each addressable VCR controller 30 is connected to control bus 34 which permits the VCR controllers 30 to be in communication with the receive station manager apparatus 36. The output of VCR 28 is fed to the third element being a television signal modulator 32 which modulates the output VCR signal to an unoccupied channel on local delivery network 46. An optional control line 35 is shown connecting modulator 32 with the control bus 34. The control line to the television signal modulator 32 enables the receive station manager apparatus 36 to select the channel frequency output by the modulator 32. Channel selection is useful where there are more recording/playback devices "C" than there are available television channels on local delivery network 46. Where there are more recording/playback devices "C", only the actively playing recording/playback devices "C" would be originating a signal, each into a channel assigned by receive station manager apparatus 36 and communicated to each operating recording/playback device "C" over control bus 34. It will be appreciated that any number of playback devices may be playing a video selection up to the number of available channels on the distribution network 46. Where there are no excess recording/playback devices "C", modulator 32 is a simple fixed frequency modulator that has no connection to control bus 34. Each time VCR 28 is activated, it plays its recorded programming into the same channel as set by modulator 32. The signal being received at the receiving station is modulated by fixed frequency modulator 33 to a predetermined channel and then combined with the other signals by combiner 42. The combined multichannel TV signals are launched into the local delivery network 46 by head-end distribution amplifier 44.

To provide receive station manager 36 with information over received signal line 38, the receive station manager is provided with a data recovery element that is used to recover digitally encoded data contained in the vertical blanking interval (VBI) of the television signal being received and processed. The information so decoded is encoded onto the video transmission at the uplink 12 of the satellite broadcast system. The control information encoded on the video transmission includes the receive site (i.e. 14) or sites (i.e. 14, 15 as well any other sites desired) and a request for the site to record or to stop recording the transmission on one of the VCR's available at the receive site. Thus the uplink 12 can control the stock of recorded programs maintained at each receive site. These programs can be available for subsequent playback over the network fed by the particular receive site.

The receive station manager apparatus 36 is provided with VCR control information in the received broadcast signal vertical blanking interval encoded there by the non-cyclic encoder 54 of uplink 12 as described in reference to FIG. 1. The manager 36 may receive control information from some other source (as for example the telephone network) using input line 40. The control information received by the receive station manager 36 over telephone line 40 would be to control the cyclic decoder display of receive station manager 36. The cyclic decoder of receive station manager produces a video directory page selected from the many pages being repetitively broadcast by uplink 12 using its cyclic encoder 54 as described with reference to FIG. 2. The actual page to be selected for display is controlled by information received by the receive station manager over telephone line 40. The page of information is converted to a television signal (i.e. channel 3) and is output by the receive station manager to a directory page signal line 37 that is carried to television signal combiner 42 where it can be distributed to the system users by local delivery network 46. A suitable decoder 36 is manufactured by Norpack Corporation, Kanata, Ontario under model number TTX650 as described in document 85-08962-01 entitled TTX650 Reference Manual.

It is to be understood that the foregoing detailed description is given merely by way of illustration and that many variations may be made therein without departing from the spirit of my invention as defined in the claims appended hereto.

The embodiments of the invention in which an exclusive property or privilege is claimed are defined as follows:

1. A television signal distribution system comprising:
   means for producing a television signal having at least one receive station control information encoded into the vertical blanking interval thereof;
   first transmission means for transmitting said television signal;
   at least one receive station for receiving said television signal transmitted over said first transmission means and for producing a multichannel television signal; and
   each of said at least one receive station having:
   second transmission means for transmitting said multichannel television signal to a plurality of terminations;
   at least one storage means for storing said television signal received over said first transmission means;
   storage control means responsive to said at least one receive station control information encoded into the vertical blanking interval of said television signal received over said first transmission means for activating a desired one of said at least one of storage means to store said television signal therein and for deactivating said desired one of said at least one of storage means at the end of said received television signal;
   playback control means for selectively activating a desired one of said at least one storage means to output a television signal stored therein; and
   means for combining said multichannel television signal and the output of a desired one of said at least one storage means into a combined multichannel television signal and transmitting said combined multichannel television signal over said second transmission means to said plurality of terminations.

2. A television signal distribution system as defined in claim 1, wherein said means for producing a television signal further including:
- a video source for providing a video signal to be transmitted;
- an encoder for encoding the vertical blanking interval of said video signal with video library directory information and said at least one receive station control information;
- a system controller providing said at least one receive station control information to said encoder on a real-time basis; and
- a radio frequency modulator and power amplifier for preparing said signal for transmission and transmitting said signal over said first transmission means.

3. A television signal distribution system as defined in claim 2, wherein said encoder further including:
- a cyclic encoder for repetitively encoding a video title directory maintained by said system controller into the vertical blanking interval of a signal to be broadcast, said video title directory containing descriptive information and broadcast schedule information respecting available video titles to allow users at each of said at least one receive station to determine when a desired video title will be broadcast.

4. A television signal distribution system as defined in claim 2, wherein said encoder further including:
- a non-cyclic encoder for providing said system controller with a communications path to each of said at least one receive station to transmit coded real-time control information for the control of each of said at least one receive station, said real-time control information including said at least one receive station address information to direct the control information to a desired one of said at least one receive station and specific storage means control information to activate a desired one of said at least one storage means at said desired one of said at least one receive station to record the broadcast signal and to deactivate said desired one of said at least one storage means at said desired one of said at least one receive station at the end of the broadcast signal.

5. A television signal distribution system as defined in claim 2, wherein said encoder further including:
- a cyclic encoder for repetitively encoding a video title directory maintained by said system controller into the vertical blanking interval of a signal to be broadcast, said video title directory containing descriptive information and broadcast schedule information respecting available video titles to allow users at each of said at least one receive station to determine when a desired video title will be broadcast; and
- a non-cyclic encoder for providing said system controller with a communications path to each of said at least one receive station to transmit coded real-time control information for the control of each of said at least one receive station, said real-time control information including said at least one receive station address information to direct the control information to a desired one of said at least one receive station and storage means specific control information to activate a desired one of said at least one storage means at said desired one of said at least one receive station to record the broadcast signal and to deactivate said desired one of said at least one storage means at said desired one of said at least one receive station at the end of the broadcast signal.

6. A television signal distribution system as defined in claim 2, wherein said means for producing a television signal further including:
- order entry means responsive to communications over a public switched telephone network (PSTN) with said at least one receive station to allow said at least one receive station to request receipt of a television program to be broadcast, said order entry means being operable to record the identity of said at least one requesting receive station, the identity of a desired video program, the identity of a desired one of said at least one storage means at said at least one requesting receive station to be used to record the selected video program as said at least one receive station control information, said system controller being operable, when the requested program is ultimately broadcast, to encode said at least one receive station control information into the vertical blanking interval of said video program.

7. A television signal distribution system as defined in claim 2, wherein each of said at least one storage means further comprising:
- a video cassette recorder for recording said television signal received at said at least one receive station;
- an addressable video cassette recorder controller for controlling activation of said video cassette recorder, said addressable video cassette recorder controller being connected to a control bus for communication with a receive station manager apparatus;
- a television signal modulator for receiving the output of said video cassette recorder and for modulating the output of said video cassette recorder to an unoccupied channel on a local delivery network;
- a fixed frequency modulator for receiving and modulating said television signal received by said at least one receive station to a predetermined channel; and
- a combiner for combining said modulated received television signal with said modulated output of said video cassette recorder to produce a combined multichannel television signal for delivery into a local delivery network by a head-end distribution amplifier.

8. A television signal distribution system comprising:
- means for producing a television signal having at least one receive station control information encoded into the vertical blanking interval thereof;
- at least one receive station for receiving said television signal transmitted over said first transmission means and for producing a multichannel television signal; and
- second transmission means for transmitting said multichannel television signal to a plurality of terminations;
- said means for producing a television signal including:
- a video source for providing a video signal to be transmitted;
- an encoder for encoding the vertical blanking interval of said video signal with video library directory information and said at least one receive station control information, said encoder including:
- a cyclic encoder for repetitively encoding a video title directory maintained by said system controller into the vertical blanking interval of a signal to be broadcast, said video title directory containing descriptive information and broadcast schedule information respecting available video titles to allow users at each of said at least one receive station to determine when a desired video title will be broadcast; and a non-cyclic encoder for providing said system controller with a communications path to each of said at least one receive station to transmit coded real-time control information for the control of each of said at least one receive station, said real-time control information including said at least one receive station address information to direct the control information to a desired one of said at least one receive station and storage means specific control information to activate a desired one of said at least one storage means at said desired one of said at least one receive station to record the broadcast signal and to deactivate said desired one of said at least one storage means at said desired one of said at least one receive station at the end of the broadcast signal;

a system controller providing said at least one receive station control information to said encoder on a real-time basis; and a radio frequency modulator and power amplifier for preparing said signal for transmission and transmitting said signal over said first transmission means; and order entry means responsive to communications over a public switched telephone network (PSTN) with said at least one receive station to allow said at least one receive station to request receipt of a television program to be broadcast, said order entry means being operable to record the identity of said at least one requesting receive station, the identity of a desired video program, the identity of a desired one of said at least one storage means at said at least one requesting receive station to be used to record the selected video program as said at least one receive station control information, said system controller being operable, when the requested program is ultimately broadcast, to encode said at least one receive station control information into the vertical blanking interval of said video program;

each of said at least one receive station including:

at least one storage means for storing said television signal received over said first transmission means, each said at least one storage means comprising:

a video cassette recorder for recording said television signal received at said at least one receive station;

an addressable video cassette recorder controller for controlling activation of said video cassette recorder, said addressable video cassette recorder controller being connected to a control bus for communication with a receive station manager apparatus;

a television signal modulator for receiving the output of said video cassette recorder and for modulating the output of said video cassette recorder to an unoccupied channel on a local delivery network;

a fixed frequency modulator for receiving and modulating said television signal received by said at least one receive station to a predetermined channel; and a combiner for combining said modulated received television signal with said modulated output of said video cassette recorder to produce a combined multichannel television signal for delivery into a local delivery network by a head-end distribution amplifier storage control means responsive to said at least one receive station control information encoded into the vertical blanking interval of said television signal received over said first transmission means for activating a desired one of said at least one of storage means to store said television signal therein and for deactivating said desired one of said at least one of storage means at the end of said received television signal;

playback control means for selectively activating a desired one of said at least one storage means to output a television signal stored therein; and means for combining said multichannel television signal and the output of a desired one of said at least one storage means into a combined multichannel television signal and transmitting said combined multichannel television signal over said second transmission means to said plurality of terminations.

9. A method for distributing television a signal comprising:

encoding system control information into the vertical blanking interval of a television signal prior to transmission thereof;

transmitting said television signal over a first transmission means to at least one receive station;

decoding said television signal at said at least one receive station to extract said system control information;

activating a storage means at said least one receive station in response to predetermined information in said system control information to store said television signal so that said storage means is subsequently activated to playback said television signal stored therein;

combining said television signal carried on said first transmission means and at least one television signal played back from said storage means into a combined multichannel television signal; and transmitting said combined multichannel television signal over a second transmission means from said at least one receive station to a plurality of terminations so that said combined multichannel television signal carried on said second transmission means include said television signal carried on said first transmission means and said at least one television signal played back from said storage means.

* * * * *